*INVENTOR.*
ALBERT G. BODINE JR.
BY
ATTORNEY

*INVENTOR.*
ALBERT G. BODINE JR.
BY
ATTORNEY

April 1, 1958     A. G. BODINE, JR     2,828,731
DETONATION SUPPRESSION IN INTERNAL COMBUSTION
ENGINES BY ATTENUATION OF ACOUSTIC WAVE
PATTERNS AT VELOCITY ANTI-NODE
Filed Dec. 12, 1955     3 Sheets-Sheet 3

INVENTOR.
ALBERT G. BODINE JR.
BY
ATTORNEY

United States Patent Office 2,828,731
Patented Apr. 1, 1958

2,828,731

DETONATION SUPPRESSION IN INTERNAL COMBUSTION ENGINES BY ATTENUATION OF ACOUSTIC WAVE PATTERNS AT VELOCITY ANTI-NODE

Albert G. Bodine, Jr., Van Nuys, Calif.

Application December 12, 1955, Serial No. 552,314

11 Claims. (Cl. 123—191)

This invention relates generally to internal combustion engines and to means for suppressing irregular burning and detonation of fuel-air mixture therein. The invention is based on my discovery that denoation in combustion engines involves acoustic phenomena and can be alleviated by means of certain acoustic apparatus used in combination with the combustion chamber.

The present invention is based on the fact that detonation in an engine combustion chamber produces sound waves, a large part of which are at high amplitude at resonant frequencies of the chamber, and on my discovery that the sound waves produce the various well-known and harmful manifestations of detonation. According to my original basic invention, as set forth in my Patent No. 2,662,513, these harmful effects are inhibited by interfering with or attenuating the high amplitude detonation-induced sound waves.

A general object of the present invention is the provision of novel and improved acoustic methods and apparatus for attenuation of detonation-inducing high amplitude resonant sound wave patterns in internal combustion engines.

While the causes and manner of occurrence of detonation are still subject to research which may reveal new and unexpected aspects, most investigators agree that detonation occurs when normal combustion, at its relatively slowly traveling flame front, somehow causes the pressure and temperature of the last part of the charge to reach its kindling point causing the remaining portion to go off spontaneously and at a very rapid rate; that is, it "detonates." The violent rise in temperature and pressure resulting from this detonation of the last portion of the charge is very often a shock phenomenon which sets up violet compression waves throughout the combustion chamber. I have found that these waves are actually high energy sound waves, consisting of alternate waves or pressure cycles of condensation and rarefaction following one another by 180° in the time cycle, or at least that they include such sound waves to an important extent; and that these sound waves regularly include resonant frequencies causing them to form standing wave patterns in the combustion chamber which may be calculated according to principles governing cavity resonance sound waves. The frequencies of these sound wave patterns are of course modified by the pressure and temperature of the gases involved and the resonant frequencies of adjacent mechanical structures such as the cylinders, pistons, connecting rods, etc., in pressure communication with the combustion chamber gases.

It has been observed that while ordinary normal combustion proceeds with a more or less gradual increase in pressure to a pressure peak, and a gradual decline therefrom, during which any sound waves present are of low order or harmless magnitude, when detonation occurs, pressure builds up with great rapidity to a pressure peak of amplitude substantially in excess of that normally encountered and a number of these excess pressure peaks may occur in rapid succession during the power stroke. Detonation is sometimes initiated by a preliminary shock wave in the nature of one or two suddenly occurring high pressure peaks, followed by a prolonged secondary phase consisting of succeeding pressure peaks, which finally gradually diminish in magnitude. Careful investigation shows that sound waves of low amplitude and energy content are present in the combustion chamber in the predetonation phase, and that the frequency of the wave pattern tends to increase during the high wave amplitude detonation phases, due very likely to increase gas temperatures caused by the detonation.

My investigations have shown that these phenomena, including the pressure peak or shock phase which often introduces the detonation, are of an acoustic nature developing from one or more points of sound wave origin within the flame in the combustion chamber. The sound waves so generated in the combustion gas travel to and are reflected or "echoed" by the relatively rigid chamber walls, the successive reflections of waves of resonant frequency interferring to re-enforce one another and so promote high amplitude resonant standing wave patterns in the gas, with attendant pressure and velocity anti-nodal regions. These standing wave patterns occur, I have found, at one or more resonant frequencies of the combustion chamber.

A standing wave pattern for a given resonant frequency of the combustion chamber is characterized by one or more pairs of oppositely phased pressure anti-nodes, with intervening velocity anti-nodes. A pressure anti-node is a region of a standing wave at which gas pressure oscillations are maximized and gas velocity variations are minimized. Such a region is characterized by high acoustic impedance, which is the ratio of gas pressure wave amplitude to gas particle oscillation velocity. A velocity anti-node is a region of a standing wave at which gas velocity oscillations are at maximized amplitude, and gas pressure oscillations are minimized. Such a region is a region of low acoustic impedance.

Such a standing wave pattern as described in the preceding paragraph can be suppressed or attenuated by proper disturbance of its impedance characteristics. That is to say, the entire pattern will be dissipated if one of its regions of essential high acoustic impedance is partially converted to a region of low acoustic impedance, or if one of its regions of essential low acoustic impedance is subjected to a condition of high resistive acoustic impedance. Broadly stated, the present invention involves the concept of changing a region of low acoustic impedance of a resonant standing wave pattern produced by detonation within the combustion chamber, into a region experiencing resistive acoustic impedance. For example, between two oppositely phased pressure anti-nodal regions of a standing wave pattern, where a velocity anti-nodal region is found, there may be placed a barrier wall comprising a material of high resistive impedance. By this means, the velocity oscillations of the original standing wave pattern are very materially reduced in amplitude, with the result that the entire standing wave pattern is proportionately attenuated. I have discovered that an acoustic standing wave pattern is particularly vulnerable to attenuation or destruction by thus attacking it at its velocity anti-node, and that very simple structures interposed at the velocity anti-nodal region suffice for the necessary suppression of the resonant wave pattern.

The invention will be further disclosed in connection with the drawings showing illustrative wave patterns and showing also typical embodiments of the invention. In the drawings:

Fig. 1 is a graph of combustion chamber pressure vs.

time, showing a typical pressure cycle pattern in a combustion chamber;

Figure 1:
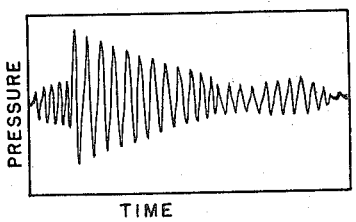

Reference is first directed to Fig. 1, showing an illustrative pressure cycle pattern occurring in a detonating engine combustion chamber as seen on a fast sweep oscilloscope driven by a sensitive pick up connected to the chamber. The pressure cycle pattern varies considerably with different engines, different fuels, and different conditions of engine operation. That here shown is merely illustrative of one somewhat typical condition. The pattern contains components which are at resonant frequencies, fundamental and higher frequency modes, of the combustion chamber.

Figure 6:
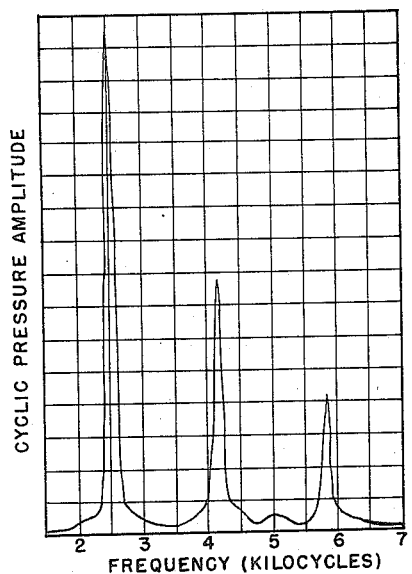
Fig. 6 is a graph of cyclic pressure amplitude vs. frequency, showing resonant peaks found in the same combustion chamber.

In the course of laboratory experimentation with a valve-in-head engine having a flat pancake cylindrical combustion chamber such as used in the well-known C. F. R. test engine, I generated sound waves within the chamber over a wide frequency band, and by use of a sensitive microphone, obtained the pressure amplitude response curve shown in Fig. 6. When the generated frequency coincided with a resonant frequency of the combustion chamber, the amplitude, as registered by the pick up microphone, was very high. A fundamental resonant response was encountered at about 2500 cycles, a strong higher mode at about 4200 cycles, a weak radial mode at 5000, and a fairly strong higher mode at 5800, all as represented in Fig. 6.

The standing wave patterns for the several modes, i. e. at the several resonant peaks, as shown in Figs. 2–5, were determined by counting the number of pressure anti-node regions P (high impedance regions) where the microphone gave maximum reading. The corresponding velocity patterns as shown by the full line and dotted line arrows in Figs. 2–5 were then postulated from known facts about cavity resonance. In these diagrams, the full line arrows represent the gas particle velocity for one phase of the acoustic standing wave pattern, and the dotted line arrows represent gas particle velocity for the succeeding phase. That is to say, for 180° of duration of each cycle of the standing wave, the gas particle velocity is in the direction of the full line arrows, and for the succeeding 180° the gas particle velocity is in the direction of the dotted line arrows.

Figure 2:
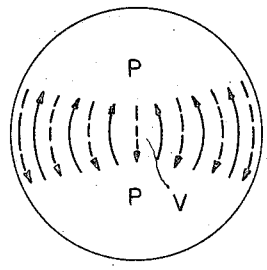
Figs. 2–5 are diagrams of fundamental and higher mode resonant sound wave patterns found in a cylindrical symmetrical combustion chamber.

Referring to the diagram of Fig. 2, representing the fundamental frequency (cold air frequency of approximately 2500 cycles per second) there are two oppositely phased high impedance pressure anti-node regions P, with an intervening low impedance velocity anti-node region V wherein the gas flow is alternately from one pressure anti-node to the other, and then in the reverse direction. This is sometimes known as the "sloshing" mode.

Figure 3:
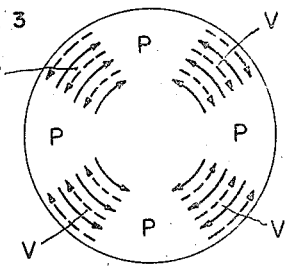
Figure 4:
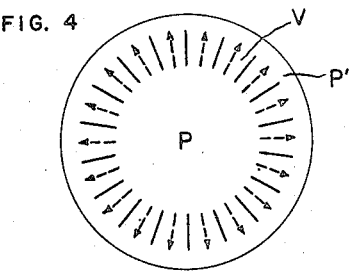
Figure 5:
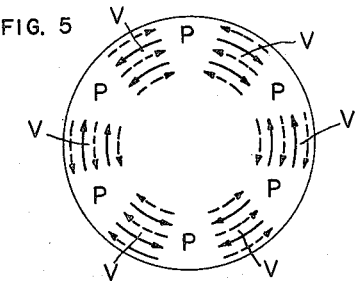

Fig. 3, representing the first higher mode (cold air frequency of approximately 4200 cycles per second) shows four high impedance pressure anti-node sectors P, with low impedance velocity anti-node gas flow regions V therebetween having an alternating flow pattern as represented by the arrows. Figure 4 shows the second higher mode (cold air frequency of approximately 5000 cycles per second), which is a radial mode. In my test work, represented by Fig. 6, it was not possible to fully explore this mode with the equipment available, and the weak response shown in Fig. 6 for the second higher mode is probably owing partly to the fact that the microphone could not be positioned exactly at the high impedance pressure anti-node regions, and partly to the fact that the radial mode gave no evidence of being strong in any event. However, it was possible to make out the pattern, which involved a high impedance pressure anti-node region P at the center, a single continuous circumferential high impedance or pressure anti-node region P' around the periphery, and a radial velocity flow pattern in the intermediate low impedance region V as indicated by the arrows. Fig. 5 shows the third higher mode (cold air frequency of approximately 5800 cycles per second), whose pattern is essentially similar to the second higher mode excepting for having six pressure anti-nodes P, with intervening low impedance velocity anti-node regions V where gas oscillation occurs, as indicated by the arrows.

The actual angular location of the pressure anti-node and velocity anti-node regions depends upon the location of the driver. The driver locates one of the high impedance regions (pressure anti-node), and all the other regions of the pattern then locate themselves according to the laws of acoustics. In the case of a circular combustion chamber, the distribution of the pattern is equi-angular, as represented in Figs. 2–5. The location of the driver controls the orientation of the pattern, but the equi-angular relationship between pressure and velocity anti-nodes is unaffected by driver location. With unsymmetrical combustion chambers, such as in L-head engines, most of the patterns would of course not be symmetrical. Further, in an actual engine, several parts of the flame may function as separate drivers, and a corresponding plurality of similar acoustic patterns may then be superimposed one over another, with no simple correlation of orientation between the patterns.

Figure 8:
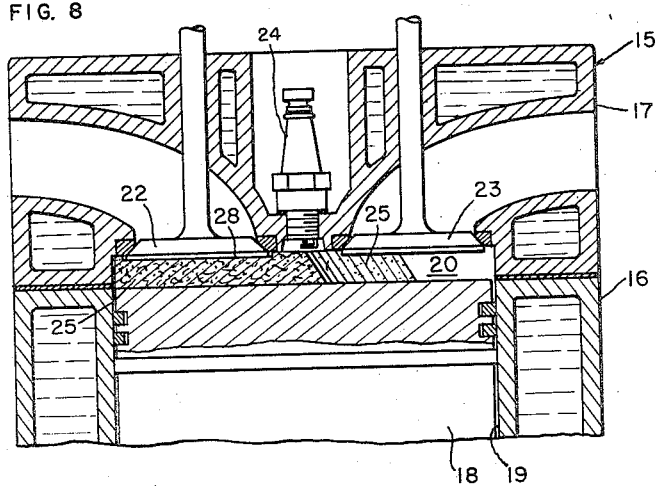
Fig. 8 is a transverse section of an engine incorporating one embodiment of the invention.
Figure 9:
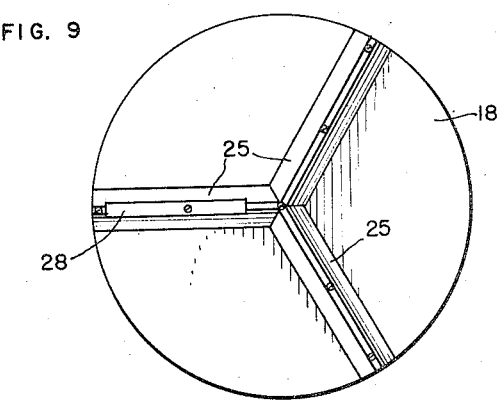
Fig. 9 is a section taken on line 9—9 of Fig. 8.
Figure 10:
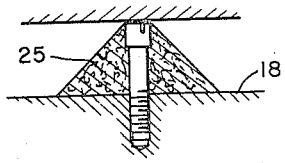
Fig. 10 is a section taken on line 10—10 of Fig. 9.

Referring now to Figs. 8–10, there is shown an illustrative engine 15 having a flat pancake type of symmetrical combustion chamber wherein resonant acoustic wave patterns such as diagrammed in Figs. 2–5 may occur, particularly under conditions of detonation. As described hereinabove, the pressure and velocity anti-node regions such as seen in Figs. 2–5 will be located in the combustion chamber between the piston and the roof of the combustion chamber, though the angular orientation of the patterns either may not be known, or may shift somewhat during the cycle. The engine of Figs. 8–10 provides means introducing a high resistive acoustic impedance in the chamber between oppositely phased pressure anti-nodes, and is effective to accomplish this purpose notwithstanding lack of exact information as to the specific angular orientation of the pressure and velocity anti-node regions. It is to be assumed, therefore, that wave patterns of the type such as represented by Figs. 2–5 are known to exist within the combustion chamber, but no assumption is made as to their angular orientation.

Referring now more particularly to the structure of the engine shown in Figs. 8–10, numeral 16 designates an engine block, 17 a head mounted on block 16, and a piston 18 is reciprocable in cylinder 19 in block 16. Head 17 forms a flat pancake shaped combustion chamber 20 over cylinder 19, and mounted in the roof of the combustion chamber are valve seat inserts for intake and exhaust valves 22 and 23, respectively, a spark plug 24 being positioned in a port in the head wall between the valves as indicated.

Mounted on the top of the piston are three walls or septums 25 disposed radially of the piston and at angles of 120° spacing, the septums joining at the center of the piston, as seen best in Fig. 9. These septums, which may have various cross sectional shapes, though are shown in Fig. 10 as having a cross section approximately that of an equilateral triangle, with the base flat on the top of the piston, bridge the distance between the top of the piston and the roof of the combustion chamber when the piston is at top dead center, as in Fig. 8. The walls of septums 25 are formed of some suitable porous sound wave absorptive or dissipative material capable of withstanding the high temperatures of the combustion chamber, and are preferably of porous sintered metal, formed, for example, from either powder or fine wire. The techniques involved in making porous sintered metal are well known and need not be described herein, it being merely noted that the wall material should be porous so as to permit gas penetration, but with gas passages or interstices of such small dimensions as to introduce great resistive impedance to the acoustic flow of the gas. It will be seen that a body of such material located in a velocity anti-node region of a resonant sound wave pattern will permit gas flow, rather than to act as an impenetrable reflector; but that the resistance to gas flow is very high, and a large amount of frictional or resistive impedance is thereby introduced, serving to dissipate a large proportion of the energy of the standing wave.

Referring again to Figs. 8 and 9, it is seen that, in the arrangement there indicated, the valve 23 is disposed between two of the septums 25, while the valve 22 directly overlies the remaining septum 25. The latter septum is accordingly recessed slightly as indicated at 28, so that at top dead center, when both valves are closed, the septum 25 directly under the valve 22 can just engage the lower surface of the latter.

Figure 7:
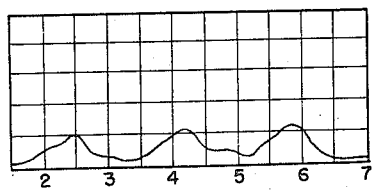
Fig. 7 is a graph similar to Fig. 6, but showing the effect of sound wave attenuators in accordance with the invention.

In the operation of the engine as thus described, conditions in the flame and in the fuel which under ordinary circumstances initiate the development of resonant wave patterns of the type of Figs. 2-5 still exist. However, the resonant wave patterns are strongly suppressed by the high resistance, dissipative septums 25 extending across the gas oscillation paths, as represented by Fig. 7.

An important feature of the invention is that the septums are preferably used in odd numbers, for example, three at 120° spacing in the case of Figs. 8-10. Considering any of the modes of Figs. 2, 3 and 5, it will be seen that oppositely phased pressure anti-nodes appear in even numbers, with velocity anti-nodes, also in even numbers, intervening therebetween. Accordingly, no matter what the orientation of the three (more generally, odd numbered) septums relative to the wave pattern, there is positive assurance that one septum will intervene and form a barrier between two of the pressure anti-nodes, or in other words, will extend across a velocity anti-node, where gas oscillation must be relatively unimpeded if a strong acoustic wave pattern is to develop. The porous absorptive septum, which presents a resistive frequency response at these acoustic frequencies, introduces a barrier of highly resistive material in this velocity anti-node region, and therefore prevents development of the velocity anti-node which is an integral part of the unwanted wave pattern. The wave pattern therefore appears only weakly, and the conditions under which serious detonation can occur is thus prevented.

It will be observed that at top dead center, the septums form full width porous barriers between the piston and the roof of the combustion chamber, but that as the pistons lower, spaces open up between the upper edges of the barriers and the roof of the combustion chamber. To that extent, some degree of gas oscillation over the tops of the barriers is of course possible. However, in passing over these frequency responsive barriers, the oscillating gas particles scrub against the surfaces thereof, with material dissipative effect.

Figure 11:
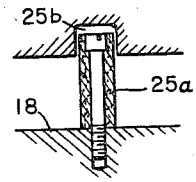
Fig. 11 is a view similar to Fig. 10 but showing a modification.

A further improvement in this regard is had by use of the improvement shown in Fig. 11, wherein the porous dissipative barriers 25a enter at top dead center into grooves 25b formed in the roof of the combustion chamber. Similar grooves can be formed in valves overlying portions of the septums, but it is usually not necessary to be quite so thorough. The septums are correspondingly taller in this case, and the beginning and final extent of gas oscillation over the tops of the septums is thereby delayed and reduced.

Figure 12:
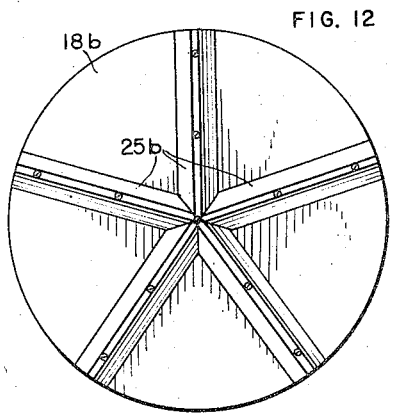
Fig. 12 is a plan view of a modified piston in accordance with the invention.

Fig. 12 shows a modified piston 18b having a larger odd number of septums 25b, in this case five. The increased number of septums is useful for cases in which the higher modes are particularly bothersome, such as in large-bore engines.

The radially disposed septums described hereinabove lie athwart the velocity anti-node regions of the wave patterns of Figs. 2, 3, and 5, but do not have this relationship to the radial mode wave pattern of Fig. 4. However, the radial mode is generally relatively weak in character, and a material attenuative effect is obtained by the scrubbing effect of the oscillating gas particles along the side surfaces of the porous septums. The septums in this case do not function as barriers, but their porous nature does result in substantial attenuation of the radial mode by reason of gas scrubbing along the surfaces of the porous material.

Figure 13:
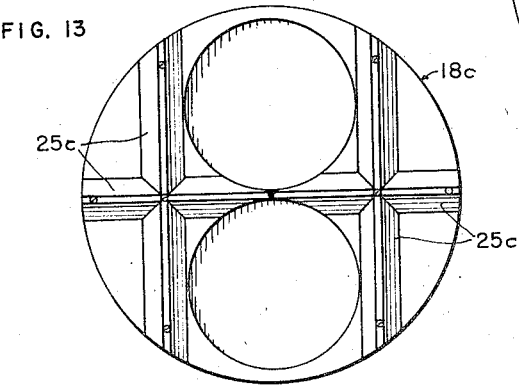
Fig. 13 is a view similar to Fig. 12 but showing another modification.

Fig. 13 shows a piston 18c having septums 25c in a configuration to avoid encroachment on the areas occupied by the valves. The piston in this case will be understood to be usable in an engine similar to that of Fig. 8, but with somewhat enlarged valves. The spark plug in this case may be removed from its centered position and mounted in a side wall of the head block, at 90° spacing from the valves or in the roof of the combustion chamber, in either of the two areas unoccupied by valves, as will be readily understood. As will be seen from Fig. 13, the porous septums 25c are again in such a configuration as to always lie athwart one or more velocity anti-node regions of the several wave patterns shown in Figs. 2, 3 and 5, regardless of wave orientation. In addition, the septums in this case are such as to form barriers across the velocity anti-node region for the radial mode for a large extent of the chamber.

Figure 14:
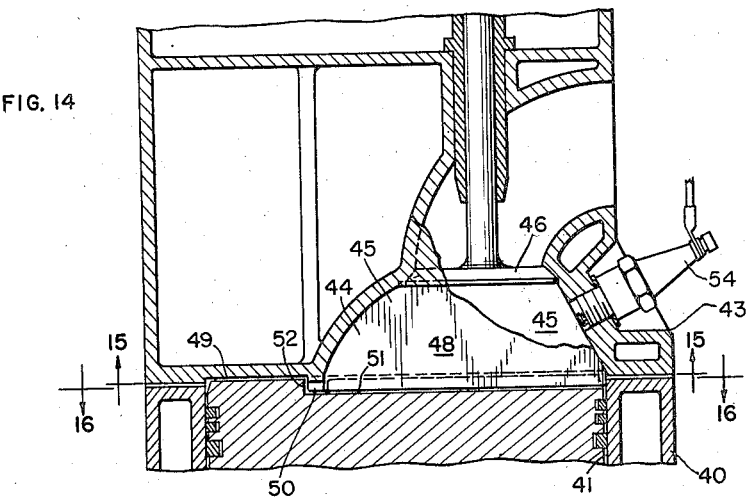
Fig. 14 is a transverse section through another form of engine showing another modified form of the invention.
Figure 15:
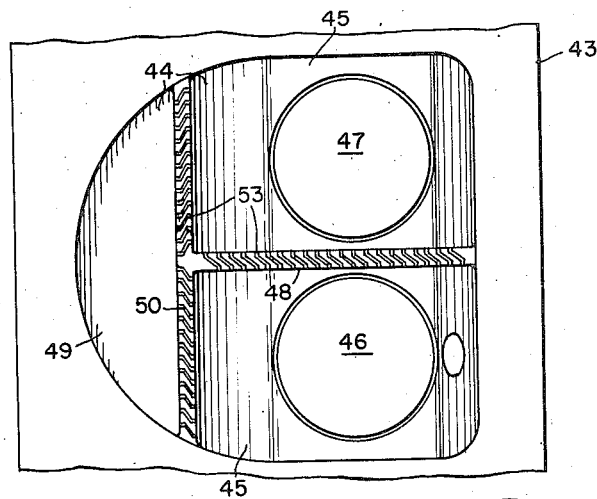
Fig. 15 is a section taken on line 15—15 of Fig. 14.
Figure 16:
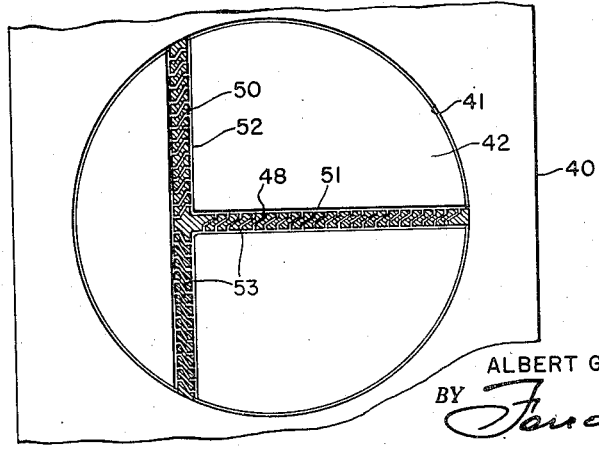
Fig. 16 is a view taken on line 16—16 of Fig. 14.

Figs. 14-16 show a valve-in-head engine having cylinder block 40 formed with cylinder 41 in which works piston 42, and head block 43 formed with combustion chamber 44. The combustion chamber 44 is formed with two pockets 45, at the top of which are seats for the intake and exhaust valves 46 and 47, and these pockets are separated by a vertical medial dividing wall 48. The combustion chamber 44 has also, in back of pockets 45, a low segment shaped portion 49 overlying a corresponding segment of the piston, and this portion 49 of the combustion chamber is separated from the pockets 45 by depending chordal wall 50 which is at right angles to medial wall 48. The walls 48 and 50, which are coplanar at their lower edges, may extend a short distance down into the cylinder, and are received by corresponding medial and chordal grooves 51 and 52, respectively, formed in the upper end of the piston.

The lower edges of the wall 50 and the wall 48 are provided with a multiplicity of acoustically restricted gas passage notches 53 extending therethrough, and these preferably contain offsets, as indicated, for purpose of increased resistance to acoustic gas flow, so as to present an attenuative response for these frequencies. The desired range of frequency response can be determined in a model engine, and then this degree of passage restriction held to reasonable tolerances in production engines.

A spark plug 54 may be mounted in any convenient location, for example, as indicated in the drawings.

The walls 48 and 50 will be seen to form perforated barriers extending across the combustion chamber. Any resonant acoustic wave pattern mode within the combustion chamber whose oppositely phased pressure anti-node regions are on opposite sides of one of these perforate barriers is subject to material attenuation. The barriers do not divide the combustion chamber into non-communicating compartments, and, indeed, such would not be in accordance with the aims of the invention, and could simply result in creating new wave patterns of higher frequencies. Instead, the barriers act to acoustically restrict the otherwise free intercommunication between oppositely phased pressure anti-nodes of existing wave patterns at their corresponding frequencies, whereby to permit said patterns to exist, but at very materially reduced amplitude by reason of the frequency responsive resistive impedance interposed at the gas oscillation or velocity anti-node regions thereof.

The invention has now been disclosed in several illustrative forms. It will of course be understood that many equivalent arrangements are possible, and are within the scope of the appended claims.

I claim:

1. Acoustic detonation suppression means for an internal combustion engine having a cylinder with a combustion chamber roof thereover and a piston working in said cylinder, and wherein resonant acoustic detonation frequency wave patterns tend to exist, that comprises: septum means in the combustion chamber dividing the chamber into at least two portions, and gas passageways through said septum means restricted to have an attenuative frequency response for a component of said acoustic detonation frequency wave patterns.

2. The subject matter of claim 1, wherein said septum means is composed of a porous material.

3. The subject matter of claim 1, wherein said septum means comprises a perforated wall.

4. The subject matter of claim 1, wherein said septum means is mounted on the top of the piston and closely approaches the roof of the combustion chamber at top dead center.

5. The subject matter of claim 4, wherein said septum means comprise an odd number of radially disposed porous barrier walls on the top of the piston.

6. The subject matter of claim 5, wherein the combustion chamber roof is formed with grooves overlying said septum walls and wherein said septum walls enter partially into said grooves at top dead center of the piston.

7. The subject matter of claim 1 wherein said septum means comprise septum walls mounted on the top of the piston, and wherein the combustion chamber roof is formed with grooves overlying said septum walls at top dead center of the piston.

8. The subject matter of claim 1, wherein said septum means comprise walls depending from the combustion chamber roof.

9. The subject matter of claim 1, wherein said septum means comprise walls depending from the combustion chamber roof, and wherein said piston has grooves receiving a portion of said walls at top dead center.

10. The subject matter of claim 1, wherein said septum means comprise septum elements disposed generally radially of the cyinder.

11. The subject matter of claim 1, wherein said septum means comprise septum elements disposed generally transversely of the cylinder.

References Cited in the file of this patent

UNITED STATES PATENTS

| 2,692,591 | Tatter | Oct. 26, 1954 |

FOREIGN PATENTS

| 15,952 | Switzerland | Dec. 15, 1897 |
| 419,500 | Germany | July 7, 1923 |